(12) United States Patent
Sasaki et al.

(10) Patent No.: US 9,468,072 B2
(45) Date of Patent: Oct. 11, 2016

(54) VEHICLE LAMP SYSTEM

(71) Applicant: KOITO MANUFACTURING CO., LTD., Tokyo (JP)

(72) Inventors: Masaru Sasaki, Shizuoka (JP); Takeshi Masuda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 153 days.

(21) Appl. No.: 13/934,796

(22) Filed: Jul. 3, 2013

(65) Prior Publication Data
US 2014/0009065 A1 Jan. 9, 2014

(30) Foreign Application Priority Data

Jul. 5, 2012 (JP) ................................ 2012-151179

(51) Int. Cl.
| | | |
|---|---|---|
| *B60Q 1/00* | (2006.01) | |
| *H05B 37/02* | (2006.01) | |
| *B60Q 1/08* | (2006.01) | |
| *B60Q 11/00* | (2006.01) | |
| *B60Q 1/44* | (2006.01) | |
| *B60Q 1/50* | (2006.01) | |

(52) U.S. Cl.
CPC ........... *H05B 37/0209* (2013.01); *B60Q 1/085* (2013.01); *B60Q 1/44* (2013.01); *B60Q 1/50* (2013.01); *B60Q 11/005* (2013.01); *B60Q 2300/116* (2013.01); *B60Q 2300/146* (2013.01)

(58) Field of Classification Search
CPC .... H05B 37/0209; B60Q 1/085; B60Q 1/44; B60Q 1/50; B60Q 11/005; B60Q 2300/116; B60Q 2300/146

USPC ...................... 315/80, 82; 362/464, 466, 276
See application file for complete search history.

(56) References Cited

U.S. PATENT DOCUMENTS

| | | | | |
|---|---|---|---|---|
| 6,066,951 A | * | 5/2000 | Maass ................. | G01R 31/005 324/403 |
| 6,250,788 B1 | | 6/2001 | Muller | |
| 6,481,876 B2 | * | 11/2002 | Hayami ................. | B60Q 1/085 362/276 |
| 7,635,952 B2 | * | 12/2009 | Takeda et al. .................. | 315/80 |
| 8,398,284 B1 | * | 3/2013 | Dvorzsak .............. | F21S 48/215 362/249.02 |
| 8,648,535 B2 | * | 2/2014 | Tatara ............................. | 315/81 |
| 8,872,425 B2 | * | 10/2014 | Endo et al. ..................... | 315/82 |
| 2004/0095234 A1 | | 5/2004 | Sugimoto et al. | |
| 2007/0127256 A1 | | 6/2007 | Uchida et al. | |

FOREIGN PATENT DOCUMENTS

| | | |
|---|---|---|
| CN | 1120001 A | 4/1996 |
| CN | 201030820 Y | 3/2008 |

(Continued)

OTHER PUBLICATIONS

Office Action dated Mar. 19, 2015, issued by the State Intellectual Property Office of the People's Republic of China in counterpart Chinese Application No. 201310241508.6.

*Primary Examiner* — Dinh T Le
(74) *Attorney, Agent, or Firm* — Sughrue Mion, PLLC (57) ABSTRACT

A vehicle lamp system 1 includes a plurality of light source units 22R and 22L and a controller 14 which controls the plurality of light source units 22R and 22L. The controller 14 sequentially turns on the plurality of light source units 22R and 22L when signals for operating a vehicle 10 are input. Thereby, it is possible to call attention to surrounding vehicles or pedestrians when starting the vehicle 10. The vehicle lamp system 1 can call attention to surrounding vehicles or pedestrians when starting a host vehicle.

15 Claims, 8 Drawing Sheets

(56) References Cited

FOREIGN PATENT DOCUMENTS

| EP | 1411752 | A2 | | 4/2004 |
|----|---------|----|----|--------|
| JP | 2004-168076 | A | | 6/2004 |
| JP | 2006-130937 | A | | 5/2006 |
| KR | 2004106111 | | * | 9/2004 |

* cited by examiner

VEHICLE LAMP SYSTEM

CROSS-REFERENCE TO RELATED APPLICATIONS

The present application claims the benefit of priority of Japanese Patent Application No. 2012-151179, filed on Jul. 5, 2012, which is incorporated herein by reference.

BACKGROUND

1. Field of the Invention

Embodiments of the present invention relates to a vehicle lamp system which includes a plurality of light source units.

2. Related Art

In the related art, in a vehicle which includes a keyless entry function, a hazard lamp light device is known which turns on a hazard lamp when a keyless entry mechanism is used to confirm locking and unlocking of a door lock (refer to JP-A-2006-130937).

SUMMARY

However, in the hazard lamp lighting device disclosed in JP-A-2006-130937, the hazard lamp is turned on so as to confirm the locking and unlocking of the door lock, but the hazard lamp lighting device does not call attention to the surroundings when starting a vehicle.

Therefore, One or more embodiments of the present invention provides a vehicle lamp system which can call attention to surrounding vehicles or pedestrians when starting a host vehicle.

One embodiment of the present invention provides a vehicle lamp system including: a plurality of light source units; and a controller which controls the plurality of light sources units, wherein the controller sequentially turns on the plurality of light source units when signals for operating a vehicle are input.

According to the embodiment, the controller receives operation signals of the vehicle and sequentially turns on the plurality of light source units, and thus, it is possible to call attention to surrounding vehicles or pedestrians when starting a vehicle.

In the embodiment of the present invention, the controller may sequentially turn on the plurality of light source units when an ignition switch of the vehicle is turned on or a lamp switch is turned on during stopping of the vehicle.

The embodiment can call attention to the surroundings when starting the vehicle at any appropriate time either at the starting of an engine of the vehicle or before starting of the vehicle after the starting of the engine.

In the embodiment of the present invention, a maximum illuminance of each irradiation region by the plurality of light source units when the signals are input may be set so as to be lower than a maximum illuminance of each irradiation region during traveling of the vehicle.

Since the embodiment gives an impression different from the irradiation of the light source units during traveling of the vehicle is applied to the surroundings, the embodiment can more securely call attention to surrounding vehicles or pedestrians when starting the vehicle.

In the embodiment of the present invention, the controller may continuously turn on adjacent light source units of the plurality of light source units.

According to the embodiment, since the adjacent light source units are continuously turned on, defects of some light source units can be confirmed by visual observation or the like.

The embodiment of the present invention may further include detecting module for detecting abnormality of the light source unit when light source units are sequentially turned on.

According to the embodiment, abnormality of the light source unit is detected by the detecting module, and can be notified to a driver.

In the vehicle lamp system according to the embodiment of the present invention, the plurality of light source units are sequentially turned on before the vehicle starts after signals for operating the vehicle are input, and it is possible to inform surrounding vehicles or pedestrians about starting of a host vehicle and to call attention. Therefore, the vehicle lamp system according to the present invention is mounted on a vehicle, and safety of the vehicle is improved.

DETAILED DESCRIPTION

An embodiment of the present invention will be described in detail with reference to the accompanying drawings. In addition, in each drawing of the following descriptions, scales are appropriately changed in order to show each portion in recognizable sizes.

Figure 1:
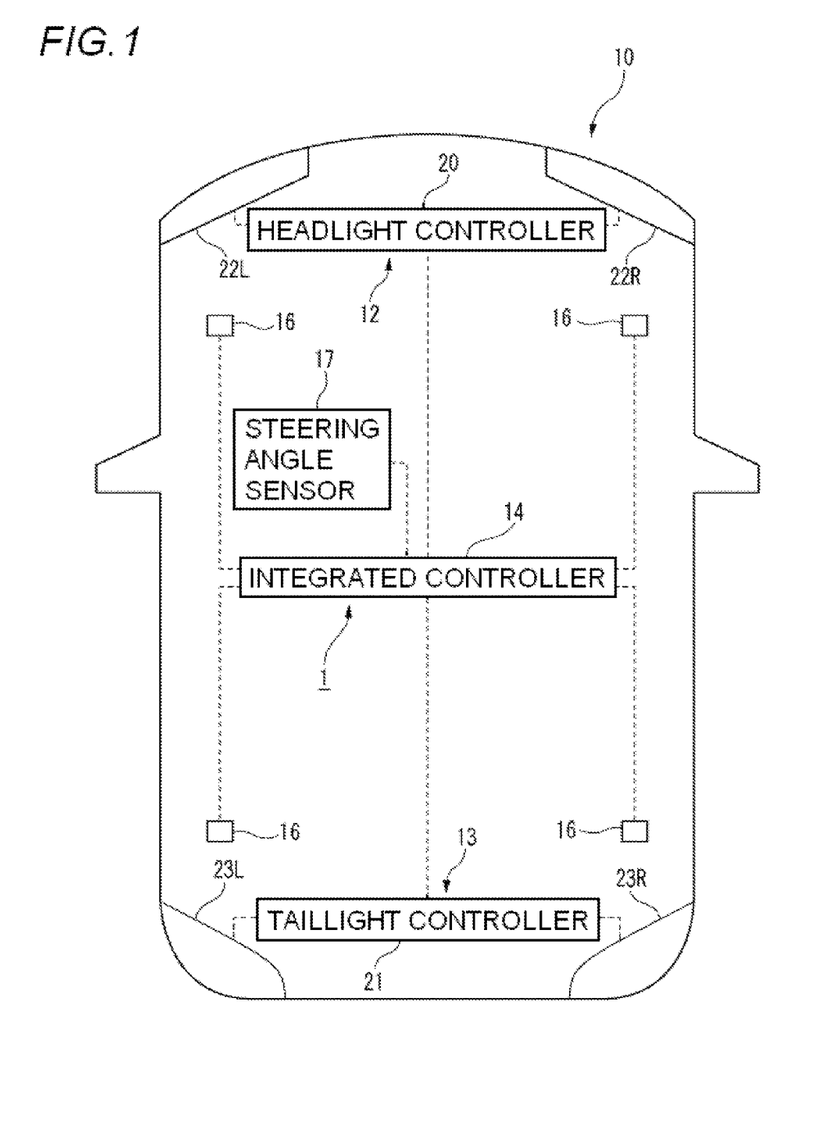
FIG. 1 is a view schematically showing an overall configuration of a vehicle on which a headlight device according to an embodiment of the present invention is mounted.

FIG. 1 is a view schematically showing an overall configuration of a vehicle 10 on which a vehicle lamp system 1 according to an embodiment of the present invention is mounted. The vehicle lamp system 1 includes a headlight device 12, a taillight device 13, an integrated controller 14, wheel speed sensors 16, and a steering angle sensor 17.

The integrated controller 14 includes a CPU which performs various calculation processing, a ROM which stores various control programs, a RAM which is used as a work area for data storing or program performance, or the like, and performs various controls in the vehicle 10.

The wheel speed sensors 16 are provided so as to correspond to each of four wheels of the vehicle 10. Each of the wheel speed sensors 16 is connected to communicate with the integrated controller 14, and outputs signals corresponding to a rotational speed of the wheel to the integrated controller 14. The integrated controller 14 calculates speed of the vehicle 10 using signals input from the wheel speed sensors 16.

The steering angle sensor 17 is provided in a steering wheel and is connected to communicate with the integrated controller 14. The steering angle sensor 17 outputs steering angle pulse signals corresponding to a steering rotation angle of the steering wheel operated by a driver to the integrated controller 14. The integrated controller 14 calculates a traveling direction of the vehicle 10 using the signals input from the steering angle sensor 17.

The headlight device 12 includes a headlight controller 20 (an example of controller), a right headlight unit 22R, and a left headlight unit 22L. Hereinafter, the right headlight unit 22R and the left headlight unit 22L are collectively referred to as a headlight unit 22 if necessary. The headlight controller 20 includes a CPU, a ROM, a RAM, or the like, and controls irradiation of light by the headlight unit 22.

The taillight device 13 includes a taillight controller 21, a right taillight unit 23R, and a left taillight unit 23L. Hereinafter, the right taillight unit 23R and the left taillight unit 23L are collectively referred to as a taillight unit 23 if necessary. The taillight controller 21 includes a CPU, a ROM, a RAM, or the like, and controls irradiation of light by the taillight unit 23.

Figure 2:
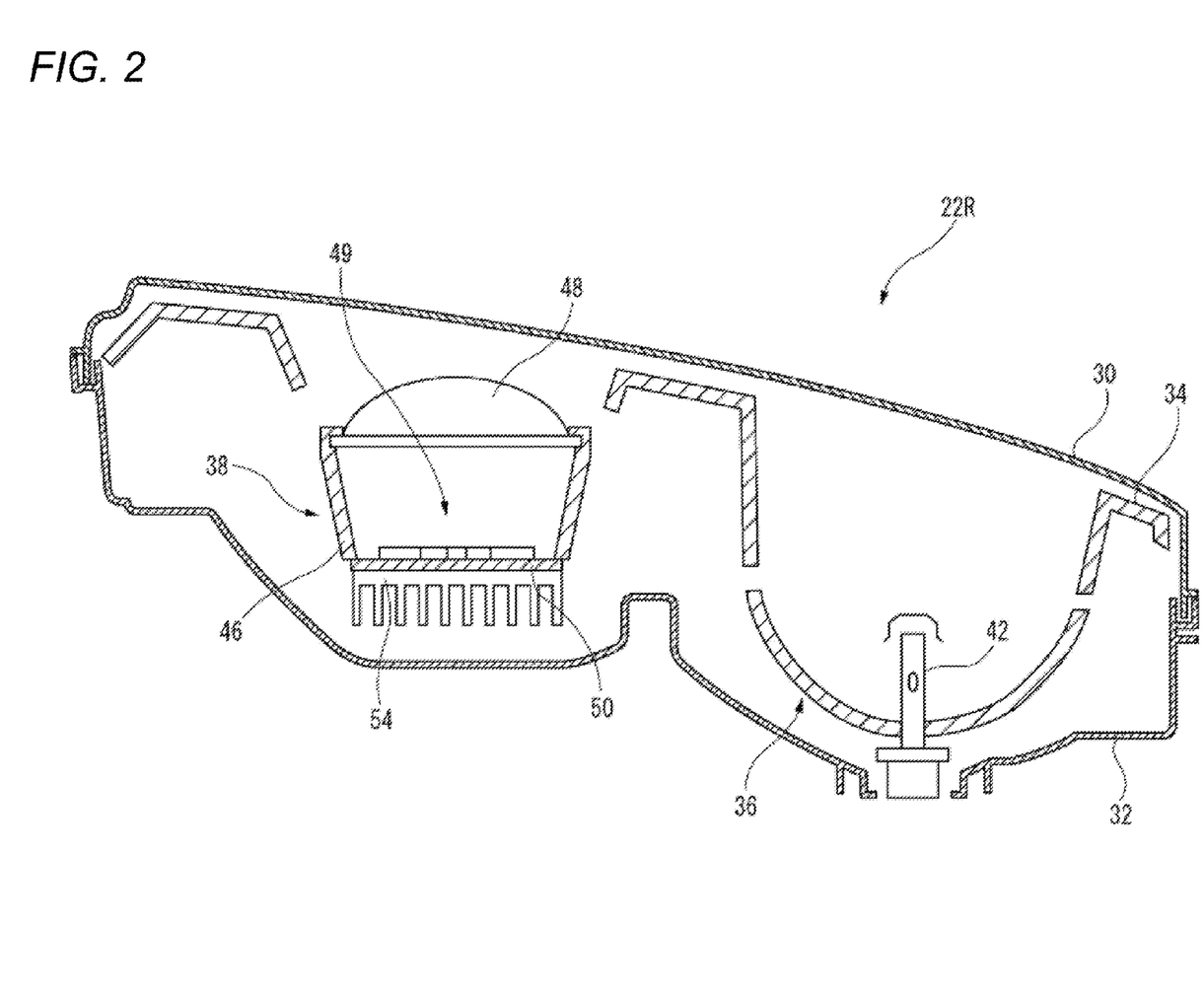
FIG. 2 is a horizontal cross-sectional view showing a configuration of a right headlight unit shown in FIG. 1.

FIG. 2 shows a cross-section when the right headlight unit 22R is cut along a horizontal surface and is viewed from above. The right headlight unit 22R includes a translucent cover 30, a lamp body 32, an extension 34, a first lamp unit 36, and a second lamp unit 38.

The translucent cover 30 is formed of a resin having translucency, and is mounted on the lamp body 32. A lamp chamber separated from the outside is formed by the lamp body 32 and the translucent cover 30. The first lamp unit 36 and the second lamp unit 38 are disposed in the lamp chamber, and the first lamp unit 36 is disposed further outside the vehicle than the second lamp unit 38.

The first lamp unit 36 is a so-called parabolic lamp unit and forms a low-beam light distribution pattern. The first lamp unit 36 uses an incandescent lamp having a filament such as a halogen lamp, and a High Intensity Discharge (HID) lamp such as a metal-halide lamp, as a light source 42.

The second lamp unit 38 includes a holder 46, a projection lens 48, a light emitting element unit 49, a substrate 50, and a heat sink 54.

The projection lens 48 is mounted to one opening portion of the holder 46 which is cylindrically formed. In the projection lens 48, the front side surface is a convex surface and the rear side surface is a planar plano-convex aspherical lens, and the projection lens makes a light source image formed on the rear focal surface be an inverted image and projects the inverted image on a virtual vertical screen in front of the lamp.

The light emitting element unit 49 is provided on the front side surface of the substrate 50, and the heat sink 54 is provided on the rear side surface of the substrate 50.

Figure 3:
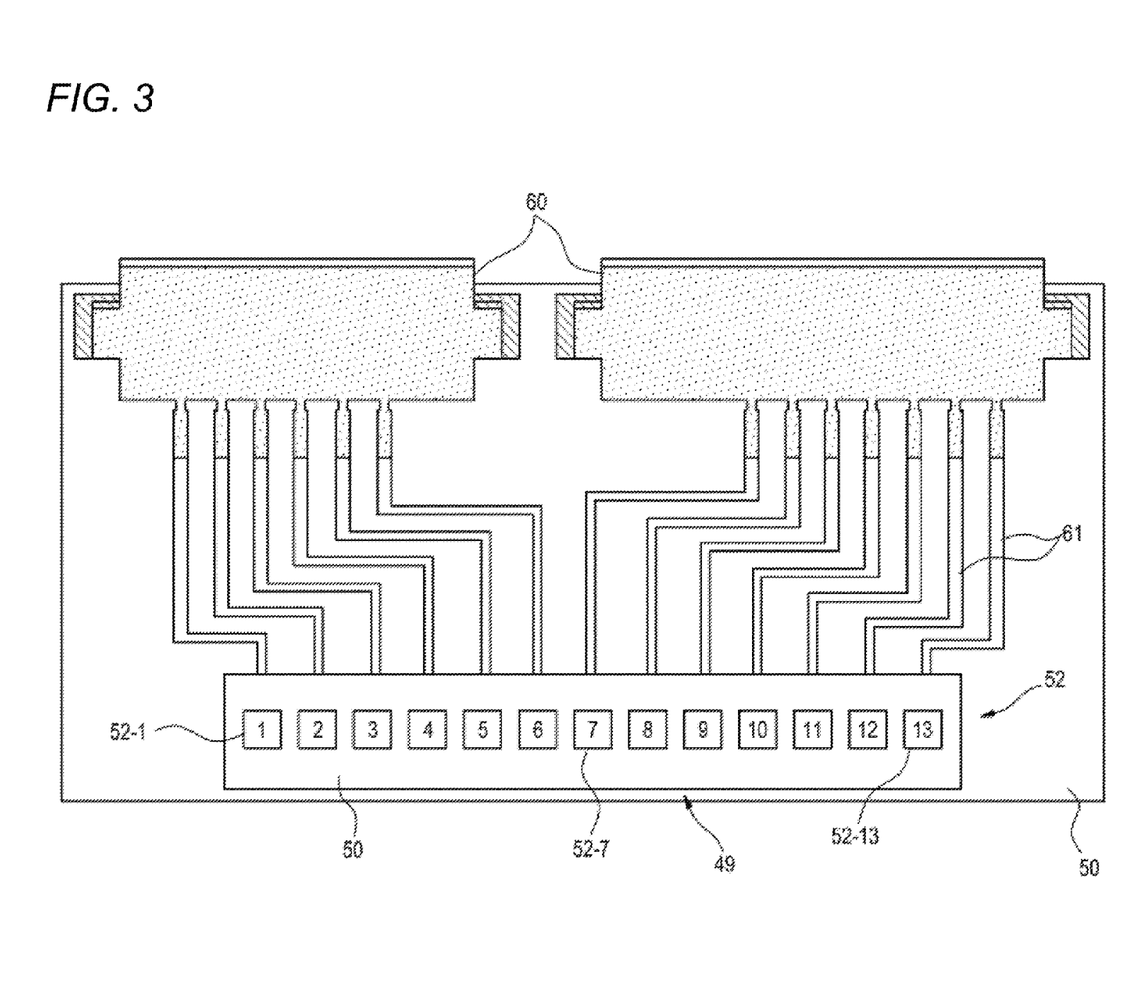
FIG. 3 is a view schematically showing a configuration of a substrate in FIG. 2.

FIG. 3 is a configuration of the substrate 50 of the right headlight unit 22R. A module 60 along with the light emitting element unit 49 is mounted on the substrate 50. The light emitting element unit 49 includes a light emitting element array 52 which is mounted on the substrate 50.

The light emitting element array 52 includes a first light emitting element 52-1 to a thirteenth light emitting element 52-13 (light source units and an example of a semiconductor light emitting element) which are arranged in a line from the right side of the vehicle toward the left.

Each light emitting element is formed in a rectangular parallelepiped shape having the same height and the same width. Although it is not shown, each light emitting element includes a light source and a thin film. The light source is a white LED (light emitting diode) having a light emitting surface of approximately 1×1 mm square, and the thin film is provided so as to cover the light emitting surface.

In FIG. 3, numbers are attached to each light emitting element, and the reference numerals except for the first light emitting element 52-1 and the thirteenth light emitting element 52-13 are omitted. For example, the light emitting element, in which a number 7 is attached to the light emitting element array 52, means a seventh lower light emitting element 52-7.

Current circuits are formed between each light emitting element and the module 60 (an example of detecting module) through signal lines 61. The module 60 is electrically connected to the headlight controller 20, and can control luminous intensity at the time of turning on and off and turning on of each light emitting element by adjusting a current amount supplied through signal lines 61 according to the control signals of the headlight controller 20.

In addition, an abnormality detection circuit is formed between the module 60 and each light emitting element through signal lines 61, and the module detects a current value or a voltage value supplied to each light emitting element, detects abnormality such as disconnection of each light emitting element, and can send abnormality detection signals with respect to the headlight controller 20.

As shown in FIG. 2, the substrate 50 is mounted to the other opening portion of the holder 46, and thus, the light emitting element unit 49 and the module 60 are disposed inside the holder 46. The plurality of light emitting elements included in the light emitting element unit 49 emit light respectively, and each image is projected on the virtual vertical screen in front of the lamp. The plurality of light emitting elements function as a plurality of light source units in the present invention.

Since the left headlight unit 22L is configured symmetrically left and right with the right headlight unit 22R, the detail descriptions are omitted. Moreover, in the left headlight unit 22L, the first light emitting element 52-1 to the thirteenth light emitting element 52-13 are arranged from the right side of the vehicle toward the left side of the vehicle. That is, with respect to the inner configuration of the second lamp unit 38, the left headlight unit 22L and the right headlight unit 22R are not symmetrically left and right with each other.

Figure 4:
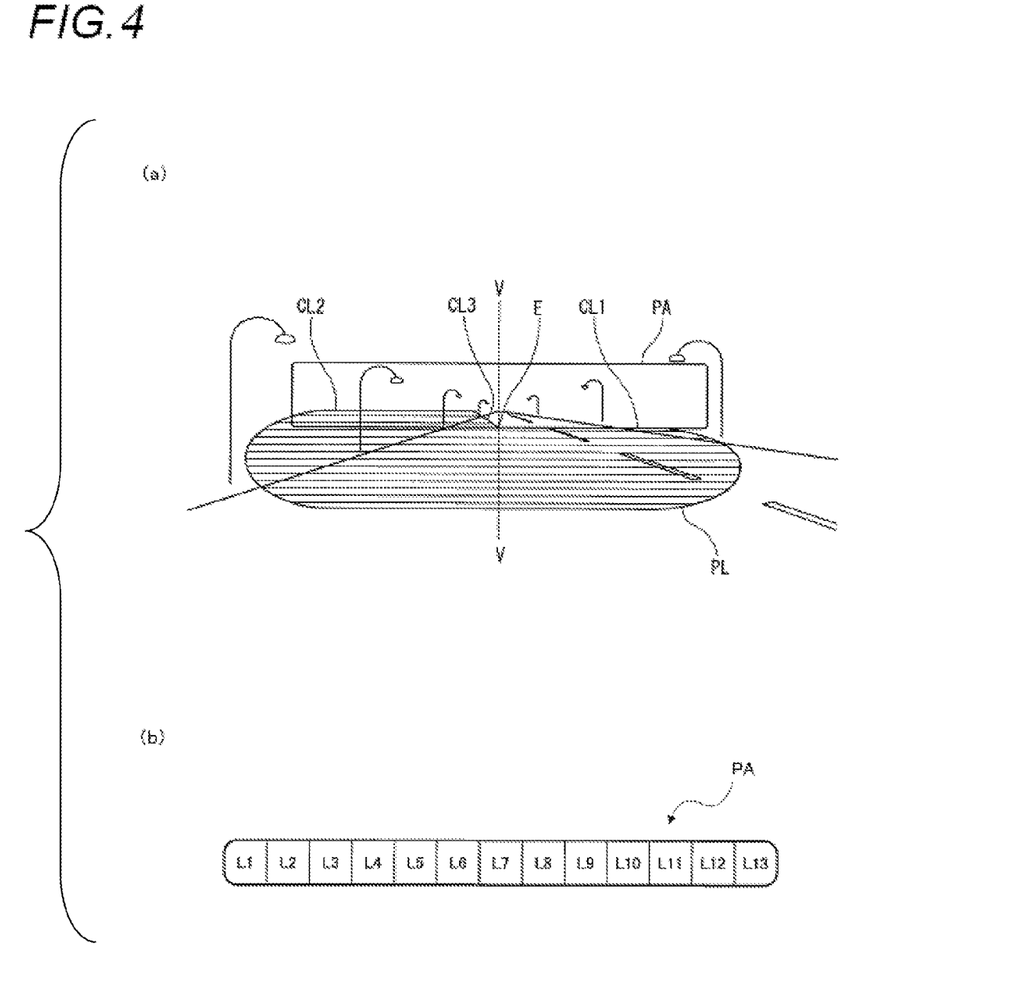
FIG. 4 is a view schematically showing a light distribution pattern which is formed by light from the headlight device shown in FIG. 1.

For example, (FIG. 4(a) shows a light distribution pattern which is formed on a virtual vertical screen disposed at a position of 25 m in front of the vehicle due to light irradiated to the front from the right headlight unit 22R and the left headlight unit 22L.

A low-beam light distribution pattern PL is formed by composition of the irradiation light from the first lamp units 36 of the right headlight unit 22R and the left headlight unit 22L. The low-beam light distribution pattern PL is a low-beam light distribution pattern of a left light distribution, and includes a first cutoff line CL1 to a third cutoff line CL3 on the upper end edge. The first cutoff line CL1 and the second cutoff line CL2 extend in a horizontal direction so as to have a left-right different level from each other with line V-V, which is a vertical line passing through a vanishing point in the front direction of the lamp, as a boundary. In addition, the third cutoff line CL3 obliquely extends toward the lower right portion from the right end portion of the second cutoff line CL2, and is connected to the left end portion of the second cutoff line CL2.

An addition light distribution pattern PA is a light distribution pattern which is formed by irradiation light from all light emitting elements included to the second lamp units 38 of the right headlight unit 22R and the left headlight unit 22L. In the additional light distribution pattern PA, the lower end is formed in a belt shape which horizontally extends so as to be positioned on the first cutoff line CL1. Therefore, the second lamp unit 38 may function as a high-beam light source.

A relationship between the additional light distribution pattern PA and the light emitting element array 52 is shown in FIG. 4(b). In this example, the additional light distribution pattern PA is divided into 13 partial regions having approximately the same shape and the same area respectively, and includes partial regions L1 to L13. The partial regions L1 to L13 are positioned near line H-H.

The partial region L1 is formed by composition of projection images having the first light emitting element 52-1 of the right headlight unit 22R and the first light emitting element 52-1 of the left headlight unit 22L as the light source image. In other words, the partial region is formed by composition of the irradiation light from the light emitting elements. Similarly, other partial regions are also formed by composition of the irradiation light from the corresponding light emitting elements of the left and right headlight units 22.

Next, a lighting control by the vehicle lamp system 1 during traveling of the vehicle will be described with reference to FIG. 5.

Figure 5:
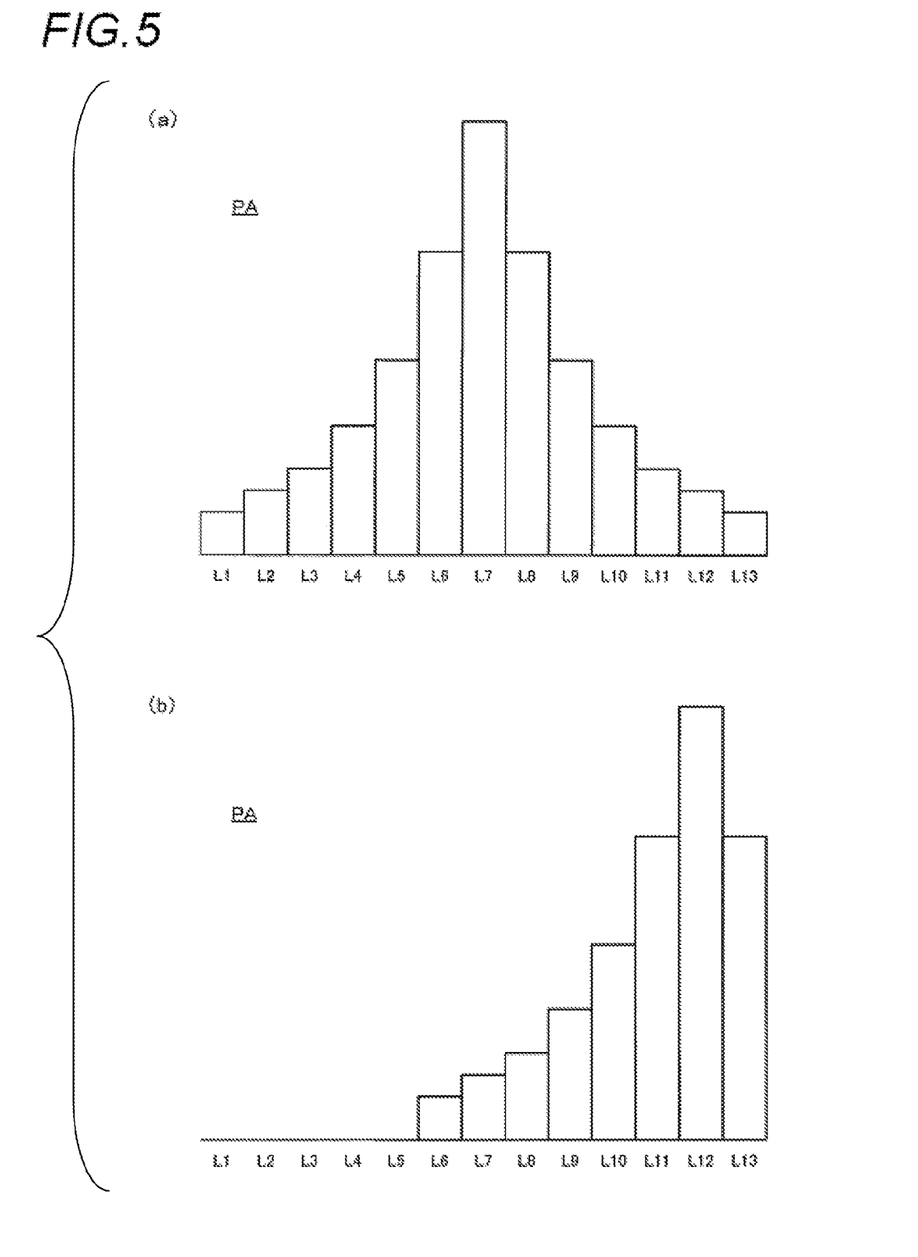
FIG. 5 is a view illustrating a lighting control by the headlight device of FIG. 1 during traveling of the vehicle.

FIG. 5 is a view showing an illuminance distribution of the partial regions L1 to L13 in the additional light distribution pattern PA when a lamp switch (not shown) for turning on the headlight unit 22 during traveling of the vehicle is turned on. The longer the bar of the graph is, the higher the illuminance is. Moreover, since the illuminance of each partial region is correspondingly related to the current amount supplied to the light emitting element which radiates light to the partial region, FIG. 5 represents a current value supplied to the light emitting element corresponding to each partial region, and the longer the bar graph is, the greater the current value is.

FIG. 5(a) shows the illuminance distribution of the partial regions L1 to L13 in the initial state, and FIG. 5(b) shows the illuminance distribution of the partial regions L1 to L13 when an electronic swivel control is performed.

First, in FIG. 5(a), the irradiation region is formed so that the vicinity of an elbow point E, which is an intersection point of the first cutoff line CL1 and the line V-V, is irradiated most brightly, and the illuminance is gradually decreased from the elbow point E toward the left and the right in the horizontal direction.

As shown in FIG. 5(b), during traveling of the vehicle 10, the integrated controller 14 can change the luminous intensity of the irradiation light by increasing or decreasing the current amount, which flows to each light emitting element of the light emitting element unit 49 included in the second lamp unit, by the headlight controller 20 based on signals input from the wheel speed sensor 16 and the steering angle sensor 17. Thereby, the illuminance of each partial region is adjusted, and the illuminance distribution in the additional light distribution pattern PA is changed. By appropriately performing the adjustment, an electronic swivel control operation can be performed, in which the irradiation region, which is an aggregation of the irradiated partial regions, moves the additional light distribution pattern PA to the left and the right in the horizontal direction. That is, the same effects as a swivel mechanism which mechanically rotates a lamp light axis of the second lamp unit 38 can be obtained.

Figure 6:
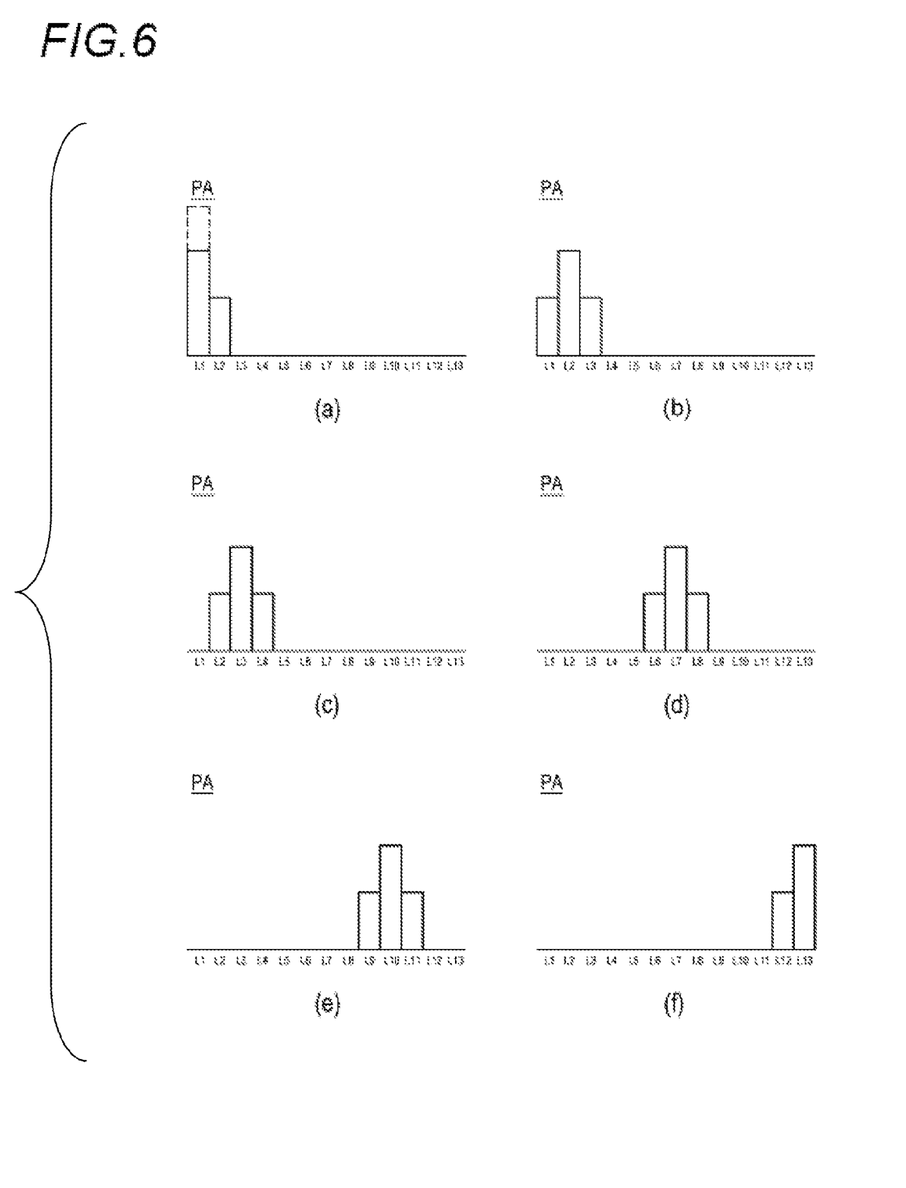
FIG. 6 is a view illustrating an electronic swivel control before starting of the vehicle by the headlight device of FIG. 1, using the light distribution pattern.

FIG. 6 shows a view in a case where the electronic swivel control is performed before starting of the vehicle in the present embodiment.

In the present embodiment, when signals for operating the vehicle 10 are input, that is, before the vehicle starts, the integrated controller 14 performs the electronic swivel control, which moves the irradiation region of the light emitting element unit 49, irrespective of signals from the wheel speed sensor 16 and the steering angle sensor 17. Moreover, FIG. 6 shows the movement of the irradiation region in the additional light distribution pattern PA in the case where electronic swivel control of the second lamp unit 38 in the left headlight unit 22L is performed. However, also in the second lamp unit 38 in the right headlight unit 22R, similarly, the electronic swivel control can be performed.

Here, the signals for operating the vehicle 10 mean signals which indicate a state where an ignition switch (not shown) of the vehicle 10 is turned on, signals which indicate a state where a lamp switch (not shown) is turned on during stopping of the vehicle 10, or the like. Moreover, the signals may be signals which indicate that a shift position is switched from a parking position to a drive position, a neutral position, or a reverse position, or signals which indicates that an accelerator pedal is stepped.

A solid line portion of FIG. 6(a) indicates the illuminance when the partial regions L1 and L2 are irradiated by the light emitting element unit 49 of the left headlight unit 22L. A dashed line portion of FIG. 6(a) indicates a maximum illuminance of the irradiation region during the traveling of the vehicle shown in FIG. 5(a). Similarly, FIG. 6(b) indicates the illuminance when the partial regions L1 to L3 are irradiated, FIG. 6(c) indicates the illuminance when the partial regions L2 to L4 are irradiated, FIG. 6(d) indicates the illuminance when the partial regions L6 to L8 are irradiated, FIG. 6(e) indicates the illuminance when the partial regions L9 to L11 are irradiated, and FIG. 6(f) indicates the illuminance when the partial regions L12 and L13 are irradiated When signal for operating the vehicle 10 are input, the integrated controller 14 sequentially turns on the first light emitting element 52-1 to the thirteenth light emitting element 52-13 of the left headlight unit 22L. Moreover, at this time, according to the order shown in FIG. 6(a) to FIG. 6(f), it is preferable to continuously turn on the adjacent light emitting elements of the first light emitting element 52-1 to the thirteenth light emitting element 52-13 so that the irradiation region moves from the partial region L1 of the left end of the irradiation region toward the partial region L13 of the right end.

In addition, when the first light emitting element 52-1 to the thirteenth light emitting element 52-13 are sequentially turned on, it is preferable to simultaneously turn on one or more and three or less light emitting elements of the first light emitting element 52-1 to the thirteenth light emitting element 52-13.

Although it is not shown, concurrently with the turning-on of the first light emitting element 52-1 to the thirteenth light emitting element 52-13 of the left headlight unit 22L, the integrated controller 14 sequentially turns on the first light emitting element 52-1 to the thirteenth light emitting element 52-13 of the right headlight unit 22R. At this time, conversely to the left headlight unit 22L, in the right headlight unit 22R, it is preferable to continuously turn on the adjacent light emitting elements of the first light emitting element 52-1 to the thirteenth light emitting element 52-13 so that the irradiation region moves from the partial region L13 of the right end of the irradiation region toward the partial region L1 of the left end.

In a case where abnormality such as disconnection occurs in some light emitting elements, when the first light emitting element 52-1 to the thirteenth light emitting element 52-13 are sequentially turned on, the current values or the voltage values of some light emitting elements are changed. The change is detected by the module 60, and thus, abnormality detection signals, which inform abnormality of the light emitting element, are sent to the integrated controller 14.

In addition, as shown in FIGS. 6(a) to 6(f), when the adjacent light emitting elements of the first light emitting element 52-1 to the thirteenth light emitting element 52-13 are continuously turned on, defects of respective light emitting elements can be confirmed by visual observation of a driver.

Since the electronic swivel control in the present embodiment is to call attention to surrounding vehicles or pedestrians when starting the vehicle 10 or to confirm the defects of each light emitting element, it is not needed to be bright as during traveling of the vehicle. Thereby, as shown in FIG. 6(a), it is preferable that the values of current flowing to the first light emitting element 52-1 to the thirteenth emitting element 52-13 be set so that the maximum illuminances of the partial regions L1 to L13 which are each irradiation region by the first light emitting element 52-1 to the thirteenth light emitting element 52-13 when the signals input for operating the vehicle 10 are lower than the maximum illuminances of the partial regions L1 to L13 during traveling of the vehicle which are shown in FIG. 5 and by a dashed line portion of FIG. 6(a).

As described above, in the vehicle lamp system of the present embodiment, the first light emitting elements 52-1 to the thirteenth light emitting element 52-13 are sequentially turned on at an appropriate timing before the starting of the vehicle 10 at the time of the engine starting or after the engine starting of the vehicle 10, and thus, it is possible to inform surrounding vehicles or pedestrians about the starting of a host vehicle and to call attention. Therefore, the vehicle 10 mounts the vehicle lamp system 1 of the present embodiment, and thus, the safety of the vehicle is improved.

Moreover, the maximum illuminances of the partial regions L1 to L13 when signals input for operating the vehicle 10 are set so as to be lower than the maximum illuminances of the partial regions L1 to L13 during traveling of the vehicle. Therefore, since the vehicle lamp system 1 of the present embodiment can apply a different impression from the irradiation during the traveling of the vehicle to surrounding vehicles or pedestrians, it is possible to securely call attention to surrounding vehicles or pedestrians.

In addition, since abnormality of the first light emitting element 52-1 to the thirteenth light emitting element 52-13 can be detected by the module 60 when the electronic swivel control is performed, defects of each light emitting element can be notified to a driver before the starting of the vehicle 10. Moreover, since the first light emitting element 52-1 to the thirteenth light emitting element 52-13 can be continuously turned on, defects of each light emitting element can be confirmed even by visual observation of a driver.

In addition, since the electronic swivel control can be performed even during stopping of the vehicle 10 irrespective of the signals from the wheel speed sensor 16 and the steering angle sensor 17, differentiation of a visual function to other vehicles can be achieved, and marketability can be improved.

As described above, an example of embodiments of the present invention is described. However, the present invention is not limited to the above-described embodiment, and can adopt other configurations if necessary.

In the above-described embodiment, the example, in which the electronic swivel control of the light emitting element unit 49 included in the headlight device 12 provided in the front of the vehicle is performed, is described. However, also in the taillight unit 23 of the taillight device 13 provided in the rear of the vehicle, similarly, the electronic swivel control of the light emitting element unit can be performed. According to this configuration, the electronic swivel control is also performed in the taillight unit 23, and for example, when signals, which indicate that the shift position is changed to the reverse position, are input, each light emitting element included in the taillight unit 23 is sequentially turned on, it is possible to call attention to surrounding vehicles or pedestrians to the reverse traveling direction of the vehicle.

Moreover, the headlight device 12 and the taillight device 13 can be controlled so as to be sequentially turned on in the circumferential direction in a plan view of the vehicle. Moreover, the first lamp unit 36 and the second lamp unit 38 are regarded as one light source unit respectively, and the first lamp unit 36 and the second lamp unit 38 can be controlled so as to be sequentially turned on.

Moreover, in the above-described embodiment, the first light emitting element 52-1 to the thirteenth light emitting element 52-13 are sequentially turned on so that the irradiation region moves from the partial region L1 of the left end of the irradiation region toward the partial region L13 of the right end in the left headlight unit 22L and the irradiation region moves from the partial region L13 of the right end of the irradiation region toward the partial region L1 of the left end in the right headlight unit 22R. However, the movement pattern of the irradiation region or the sequence of the turning-on is not limited to the above-described configuration.

For example, the irradiation regions may simultaneously move in the same direction in the left headlight unit 22L and the right headlight unit 22R, and after one electronic swivel control of the left headlight unit 22L and the right headlight unit 22R ends, the other electronic swivel control may start. Moreover, in each headlight unit 22, each light emitting element may be turned on so that the irradiation region is returned from one end partial region toward the other end partial region after the irradiation region moves from the other end partial region toward the one end partial reunion.

In this way, according to the present embodiment, since each light emitting element can be controlled so as to be independently turned on and off, when attention to surrounding vehicles or pedestrians is performed, variation of the turning-on pattern can be increased, and marketability can be further improved.

Figure 7:
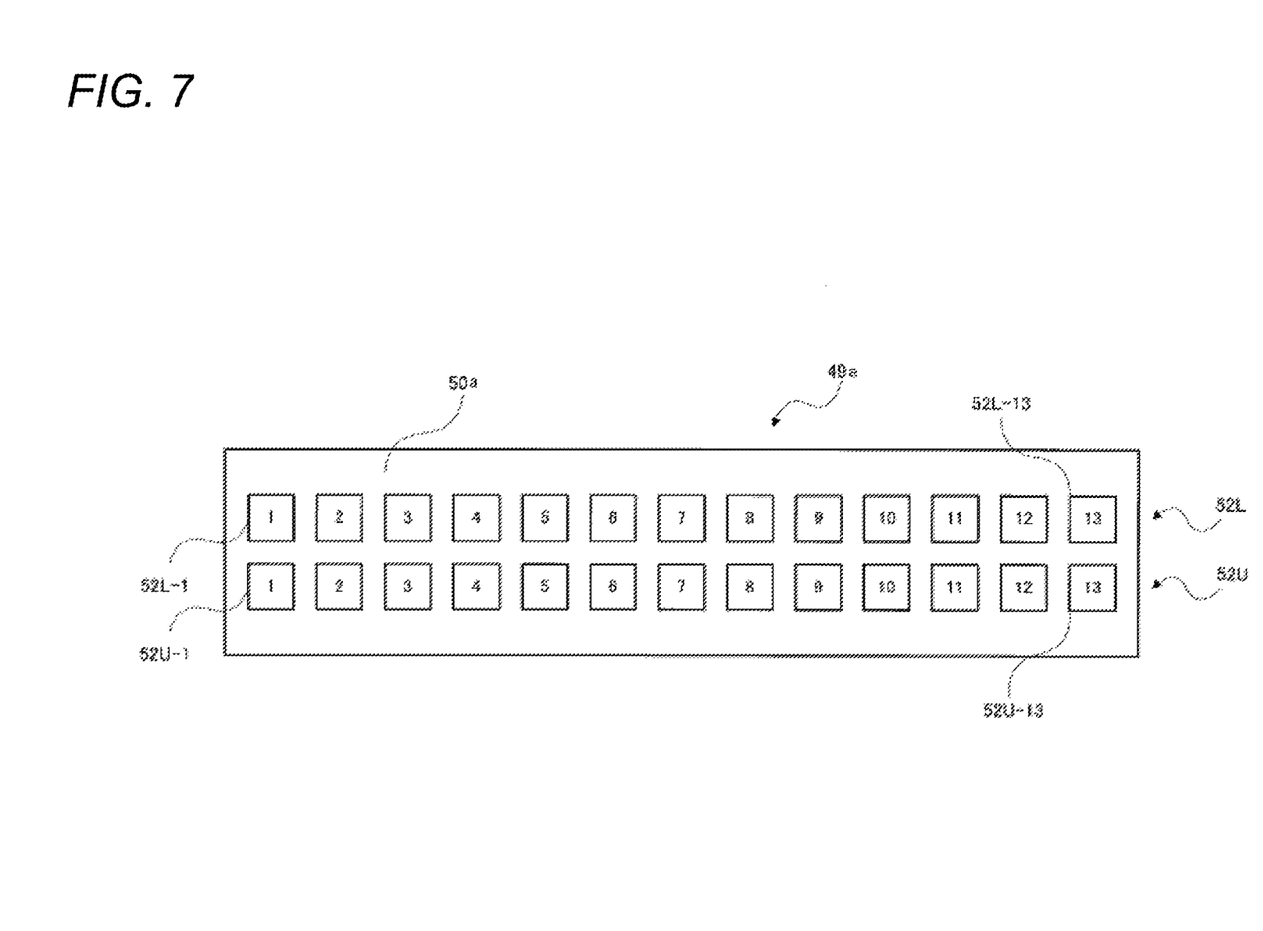
FIG. 7 is a view schematically showing a configuration of a modification example of a light emitting element unit of the present invention.

Moreover, the number of the partial regions included in the additional light distribution pattern PA is not limited to the configuration of the above-described embodiment. For example, as shown in FIG. 7, a light emitting element unit 49a may have a configuration which includes a lower light emitting element array 52L and an upper light emitting element array 52U which are mounted on the substrate 50. The lower light emitting element array 52L includes a first lower light emitting element 52L-1 to a thirteenth lower light emitting element 52L-13 arranged from the right side of the vehicle toward the left side. The upper light emitting element array 52U includes a first upper light emitting element 52U-1 to a thirteenth upper light emitting element 52U-13 arranged from the right side of the vehicle toward the left side.

Also in the configuration of FIG. 7, when signals for operating the vehicle 10 are input, the integrated controller 14 turns on and off the first lower light emitting element 52L-1 to the thirteenth lower light emitting element 52L-13 and the first upper light emitting element 52U-1 to the thirteenth upper light emitting element 52U-13 respectively, and the electronic swivel control can be performed.

Moreover, in this case, if the first upper light emitting element 52U-1 to the thirteenth upper light emitting element 52U-13 are turned on with the same luminous intensities as those of the first lower light emitting element 52L-1 to the thirteenth lower light emitting element 52L-13, there is a concern that glare may be directed upwards, outside the vehicle, and in a direction towards the surrounding vehicles or pedestrians in the light distribution. Thereby, in the present embodiment, it is preferable to perform the electronic swivel control in the state where the first upper light emitting element 52U-1 to the thirteenth upper light emitting element 52U-13 are turned off or dimmed. Alternatively, a configuration may be adopted in which a movable shade (not shown) is provided on the upper portion of the second lamp unit 38, and the upper light distribution is mechanically shaded.

Figure 8:
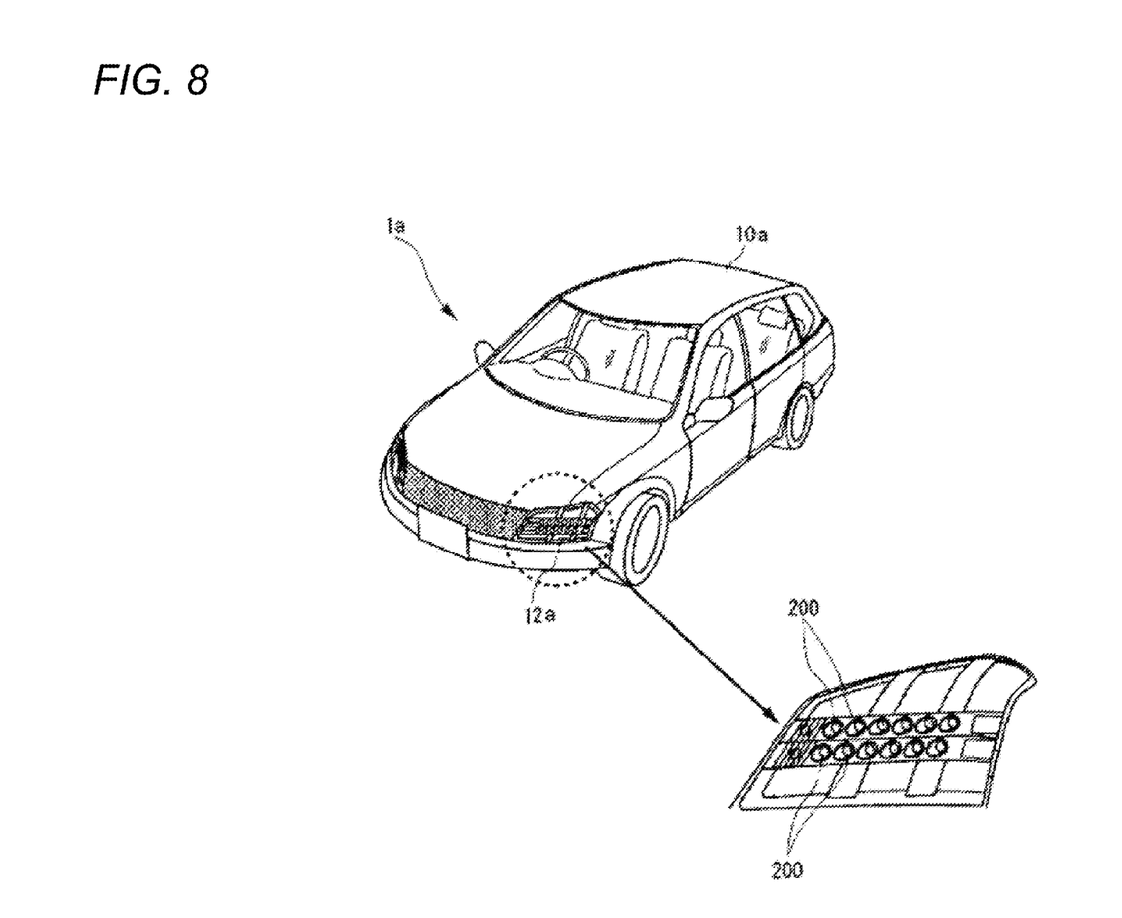
FIG. 8 is a view showing a configuration of a modification example of the vehicle lamp system of the present invention.

Moreover, in the above-described embodiment, the electronic swivel control is performed by the plurality of the first light emitting element 52-1 to the thirteenth light emitting element 52-13 which are included in the second lamp unit 38 of the right headlight unit 22R and the left headlight unit 22L. However, as shown in FIG. 8, a vehicle lamp system 1a may be used which includes a headlight device 12a using a plurality of light source units 200.

Also in this configuration, since the plurality of light source units 200 can be individually turned on and off, the plurality of light source units 200 are sequentially turned on when signals for operating the vehicle 10a are input, and thus, effects similar to those of the above-described embodiment can be obtained.

What is claimed is:

1. A vehicle lamp system comprising:
    a plurality of light source units provided in a headlamp unit; and
    a controller configure to control the plurality of light sources units,
    wherein the controller sequentially turns on the plurality of light source units in response to first control signals for operating a vehicle being input, the first control signals comprising at least one of a first signal indicating a state where ignition switch for the vehicle is turned on and a second signal indicating a state where a lamp switch for the headlamp unit is turned on during stopping of the vehicle.

2. The vehicle lamp system according to claim 1, wherein a maximum illuminance of each irradiation region by the plurality of light source units when the first control signals are input is set so as to be lower than a maximum illuminance of each irradiation region during traveling of the vehicle.

3. The vehicle lamp system according to claim 1, wherein the plurality of light source units comprise a first light source unit, a second light source unit and a third light source unit,
    wherein the controller turns on the plurality of light source units by sequentially turning on the first light source unit, turning thereafter on the second light source unit that is located at a side of the first light source unit and thereafter turning on a third light source unit that is at a side of the second light source unit, the second light source unit being located between the first light source unit and the third light source unit.

4. The vehicle lamp system according to claim 1, wherein the controller also sequentially turns off the plurality of light source units when second control signals for operating the vehicle different from the first control signals are input.

5. The vehicle lamp system according to claim 3, wherein the controller also sequentially turns off the plurality of light source units when second control signals for operating the vehicle different from the first control signals are input by sequentially turning off the first light source unit, thereafter turning off the second light source unit and thereafter turning off the third light source unit.

6. The vehicle lamp system according to claim 1, wherein the controller sequentially turns on the plurality of light source units upon the determination that the ignition switch for the vehicle is turned on to call attention to surrounding vehicles or pedestrians when starting the vehicle.

7. The vehicle lamp system according to claim 6, wherein the controller sequentially turns on the plurality of light source units upon the determination that the lamp switch is turned on during stopping of the vehicle.

8. The vehicle lamp system according to claim 1, wherein the plurality of light source units are disposed in one housing.

9. The vehicle lamp system according to claim 1, wherein the plurality of light source units comprise a first light source unit, a second light source unit and a third light source unit provided in a linear sequential order,
    wherein the controller turns on the plurality of light source units sequentially by simultaneously turning on the first light source unit with a first luminance and the second light source adjacent to the first light source unit with a second luminance lower than the first luminance, thereafter simultaneously turning on the second light source unit with the first luminance and the first and third light source units with the second luminance.

10. The vehicle lamp system according to claim 1, wherein the controller sequentially turns on the plurality of light source units in response to the ignition switch for the vehicle being turned on.

11. The vehicle lamp system according to claim 1, wherein the controller sequentially turns on the plurality of light source units before the vehicle moves after the ignition switch for the vehicle is turned on.

12. A vehicle lamp system comprising:
    a plurality of light source units;
    a controller which controls the plurality of light sources units; and
    detecting module for detecting abnormality of a current value or a voltage value supplied to each light source unit of the plurality of light source units when the plurality of light source units are sequentially turned on,
    wherein the controller sequentially turns on the plurality of light source units upon a determination that signals for operating a vehicle are input.

13. A vehicle lamp system comprising:
    a plurality of light source units provided in a headlight unit, at least one of which functions as a high-beam light source; and
    a controller configured to control the plurality of light sources units,
    wherein the controller sequentially turns on the plurality of light source units in response to first control signals for operating a vehicle being input, the first control signals comprising at least one of a first signal indicating a state where an ignition switch for the vehicle is turned on and a second si indicating a state where a lain switch for the headlamp unit is turned on during stopping of the vehicle, wherein the plurality of light source units is disposed in one housing, and wherein a maximum illuminance of each irradiation region by the plurality of light source units when the signals are input is set so as to be lower than a maximum illuminance of each irradiation region during traveling of the vehicle.

14. The vehicle lamp system according to claim 13, wherein the plurality of light source units comprise a first light source unit, a second light source unit and a third light source unit provided in a linear sequential order, wherein the controller turns on the plurality of light source units sequentially by simultaneously turning on the first light source unit with a first luminance and the second light source adjacent to the first light source unit with a second luminance lower than the first luminance, thereafter simultaneously turning on the second light source unit with the first luminance and the first and third light source units with the second luminance.

15. The vehicle lamp system according to claim 8, wherein the plurality of light source units comprises a first light source unit, a second light source unit and a third light source unit provided in a linear sequential order, and wherein the controller turns on the plurality of light source units sequentially by simultaneously turning on the first light source unit with a first luminance and the second light source unit adjacent to the first light source unit with a second luminance lower than the first luminance, thereafter simultaneously turning on the second light source unit with the first luminance and the first and third light source units with the second luminance.

* * * * *